United States Patent [19]

Schmandt et al.

[11] 4,192,663

[45] Mar. 11, 1980

[54] APPARATUS FOR COATING GLASS FIBERS

[75] Inventors: Gary M. Schmandt, Reynoldsburg, Ohio; Robert N. Chappelear; Ronnie D. Hand, both of Anderson, S.C.

[73] Assignee: Owens-Corning Fiberglas Corporation, Toledo, Ohio

[21] Appl. No.: 937,908

[22] Filed: Aug. 29, 1978

[51] Int. Cl.² ............................................. C03B 37/00
[52] U.S. Cl. ......................................... 65/11 R; 65/3 R; 65/11 W; 65/60 R; 118/238
[58] Field of Search ............ 65/3 R, 3 C, 11 R, 11 W, 65/60 R; 118/235, 238, 262

[56] References Cited

U.S. PATENT DOCUMENTS

| | | | |
|---|---|---|---|
| 2,728,972 | 1/1956 | Drummond et al. | 65/60 R |
| 2,772,518 | 12/1956 | Whitehurst et al. | 65/11 W X |
| 2,961,821 | 11/1960 | Marzocchi et al. | 57/35 |
| 2,980,956 | 4/1961 | Whitehurst et al. | 65/11 |
| 3,378,395 | 4/1968 | Faber | 427/9 |
| 3,498,263 | 3/1970 | Toledo et al. | 118/234 |
| 4,042,360 | 8/1977 | Kane et al. | 65/11 W |
| 4,071,340 | 1/1978 | Melle | 65/3 R X |

*Primary Examiner*—Arthur D. Kellogg
*Attorney, Agent, or Firm*—Ronald C. Hudgens; Philip R. Cloutier; Greg Dziegielewski

[57] ABSTRACT

Apparatus adapted to apply a coating to advancing continuous filaments comprising: a bracket; a base journaled at said bracket for rotation about a first axis; means for rotating said base; applicator means adapted to apply a coating to the advancing filaments; a carriage joined to said applicator means, the carriage being adapted for a sliding engagement with said base along a path substantially transverse to said first axis; and a first adjustment means adapted to engage said carriage to move said applicator means along a second axis substantially transverse to said first axis.

9 Claims, 5 Drawing Figures

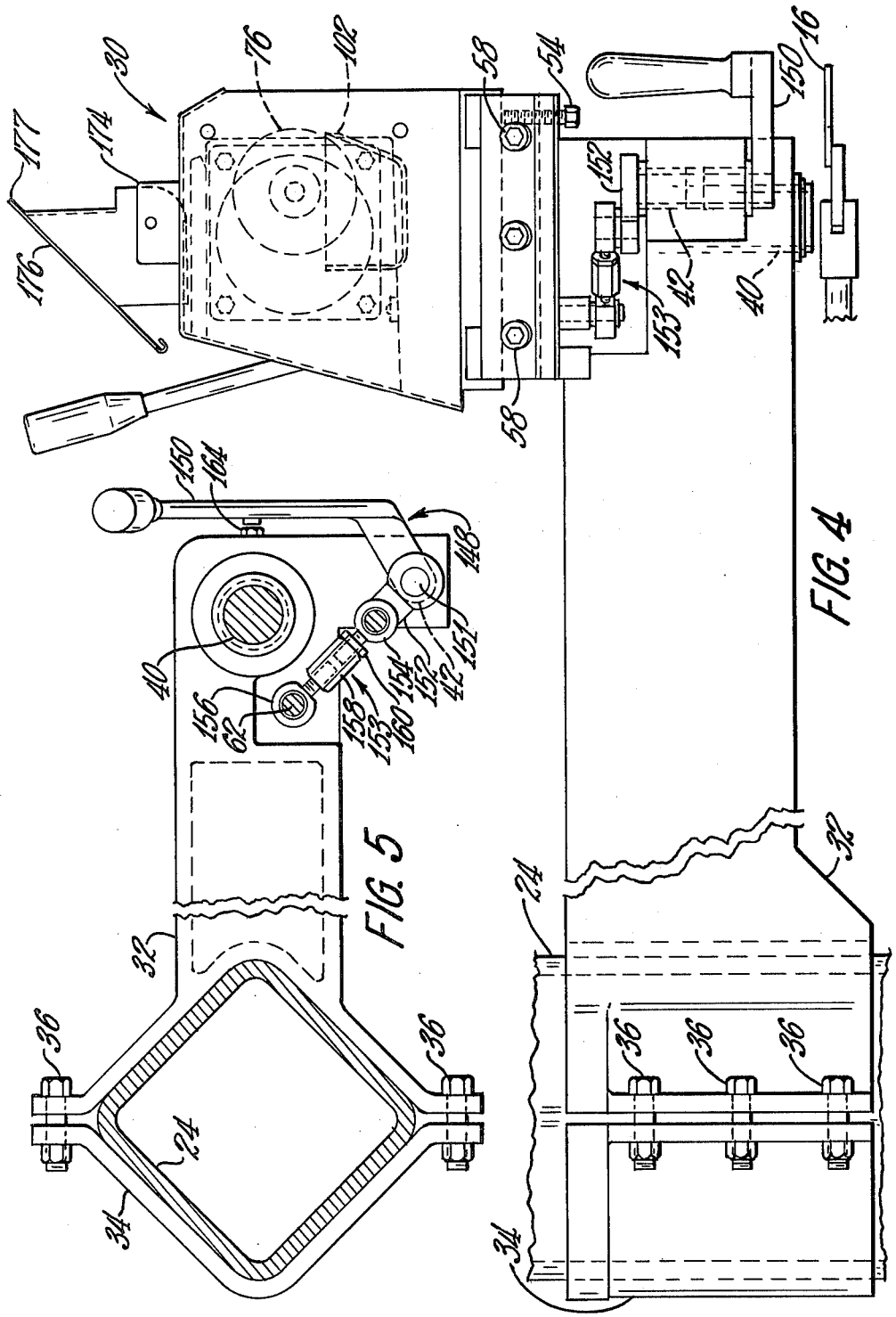

APPARATUS FOR COATING GLASS FIBERS

BACKGROUND OF THE INVENTION

Glass strand is generally produced by attenuating streams of molten material issuing from a heated bushing or feeder into continuous filaments. The filaments may be cooled by spraying them with water and/or lubricant as they leave the bushing whereupon the filaments are coated with a binder and/or size. The coated filaments are then gathered into a strand at a gathering shoe and then wound upon a winder to form a package as is know in the art.

Previously waste filaments were passed through the forming operation in the same manner as production quality filaments until the strand had passed the gathering shoe. As such, the binder and/or size being applied to the filaments was also wasted.

To circumvent this problem, coating applicator systems were developed wherein the applicator was moved away from the advancing filaments such that the binder or size was not applied to the advancing filaments. One such system is described in U.S. Pat. No. 3,378,395 issued to R. A. Faber Apr. 16, 1968.

Due to variations in construction of fiber forming operations, it is important that such movable applicator systems have several degrees of adjustment for proper orientation with respect to the advancing filaments to achieve the desired quality of coating application.

SUMMARY OF THE INVENTION

This invention pertains to apparatus adapted to apply a coating, such as a binder or a size, to advancing continuous filaments comprising a bracket; a base journaled at said bracket for rotation about a first axis; means for rotating said base; an applicator adapted to apply a coating to the advancing filaments; a carriage joined to said applicator; the carriage being adapted for sliding engagement with said base along a path substantially transverse to said first axis; and a first adjustment means adapted to engage said carriage to move said applicator along a second axis substantially transverse to said first axis.

Therefore, it is an object of this invention to provide an improved movable applicator system for applying a size and/or binder to advancing glass filaments.

The foregoing, as well as other objects of the present invention, will become apparent to those skilled in the art from the following detailed description.

DESCRIPTION OF THE DRAWINGS

FIG. 4 is a side elevational view taken from an opposite direction as viewed in FIG. 3 of the applicator system shown in FIG. 2.

FIG. 5 is a sectional plan view taken along view 5—5 in FIG. 2.

DETAILED DESCRIPTION OF THE INVENTION

Figure 1:
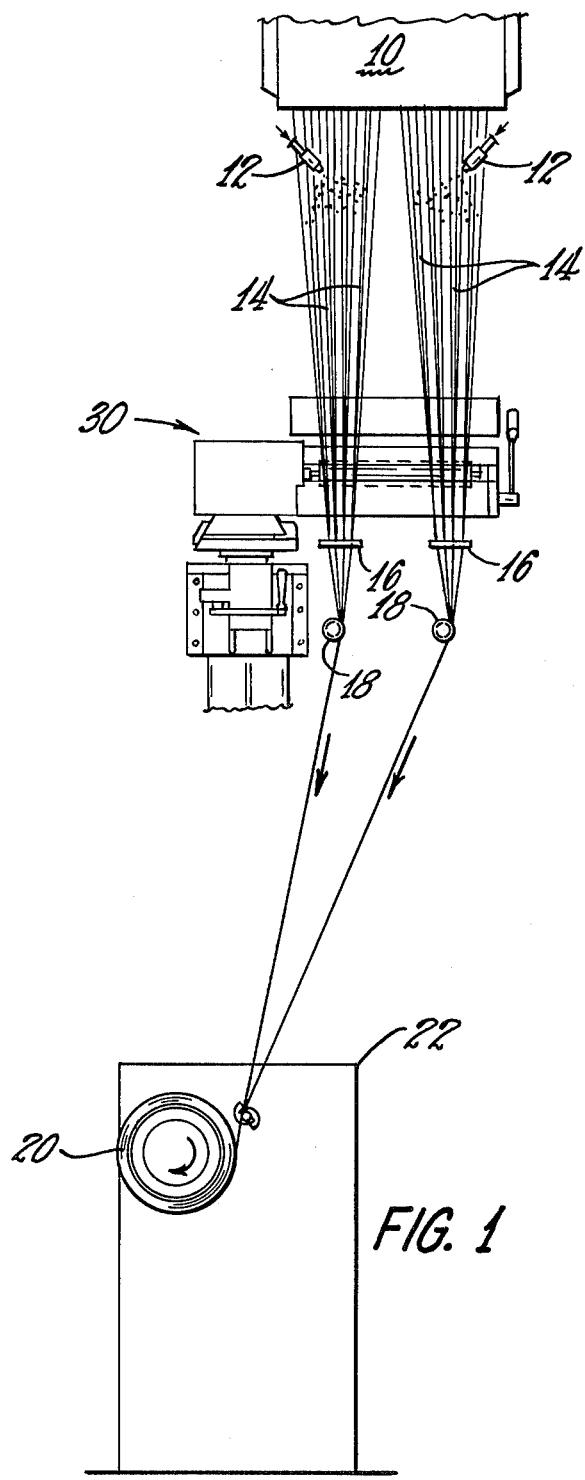
FIG. 1 is a semi-schematic frontal view of a fiber forming system.

As shown in FIG. 1, feeder 10 is adapted to supply a plurality of streams of molten inorganic material, such as glass. The streams of glass are attenuated into continuous filaments 14 through the action of attenuating means or winder 22. Just below feeder 10 nozzles 12 are adapted to apply a spray of water and/or lubricant to the advancing filaments which then pass through the region of applicator assembly 30.

As is known in the art, the filaments then can directly advance to the gathering shoes 18, or a splitter guide or guides 16 can be positioned intermediate, the applicator assembly and the gathering shoes to better maintain the filaments in a spaced apart array at the applicator assembly 30. The filaments are gathered into a pair of strands at gathering shoes 18 which are then wound into a package 20 by means of winder 22.

The applicator assembly 30 is adapted to rotate the means for applying the coating to the filaments through a substantially horizontal plane or about a first axis to a position out of contact with the filaments 14 such that the coating is not applied to the advancing filaments. Among other things, this allows the operator greater access to the feeder area and saves size and/or binder that would otherwise be applied to the advancing filaments. As shown in FIGS. 1 through 5, bracket 32 is fastened to post 24 by means of clamp 34 and fasteners 36. Bracket 32 has a bore 40 and an aperature 42 at the distal end thereof. Bore 40 has a substantially vertical first axis or center line, as well as aperature 42, which is spaced from bore 40. Rotatable base 46 is journaled for rotation at shaft 40 extending from base 46 which is registered in bore 40. Base 46 is also comprised of a beveled section 50 at one side thereof and an inwardly angled retainer means or plate 56 at the opposite side thereof. Plate 56 is suitably fastened to base 46 by means of fasteners 58. Projection 62 depends from the bottom side of base 46 to be coupled with the means for rotating base 46 as will be explained later.

Beveled carriage 60 is adapted to releasably slidably engage base 46. Base 46 and carriage 60 are adapted to permit carriage 60 to be moved along a linear path in a first or horizontal plane substantially perpendicular to the axis of bore 40 when fasteners 58 are sufficiently loosened. This provides a fore and aft horizontal adjustment for the applicator. When the applicator is properly positioned, fasteners 58 are merely tightened to securely locate carriage 60.

Figure 2:
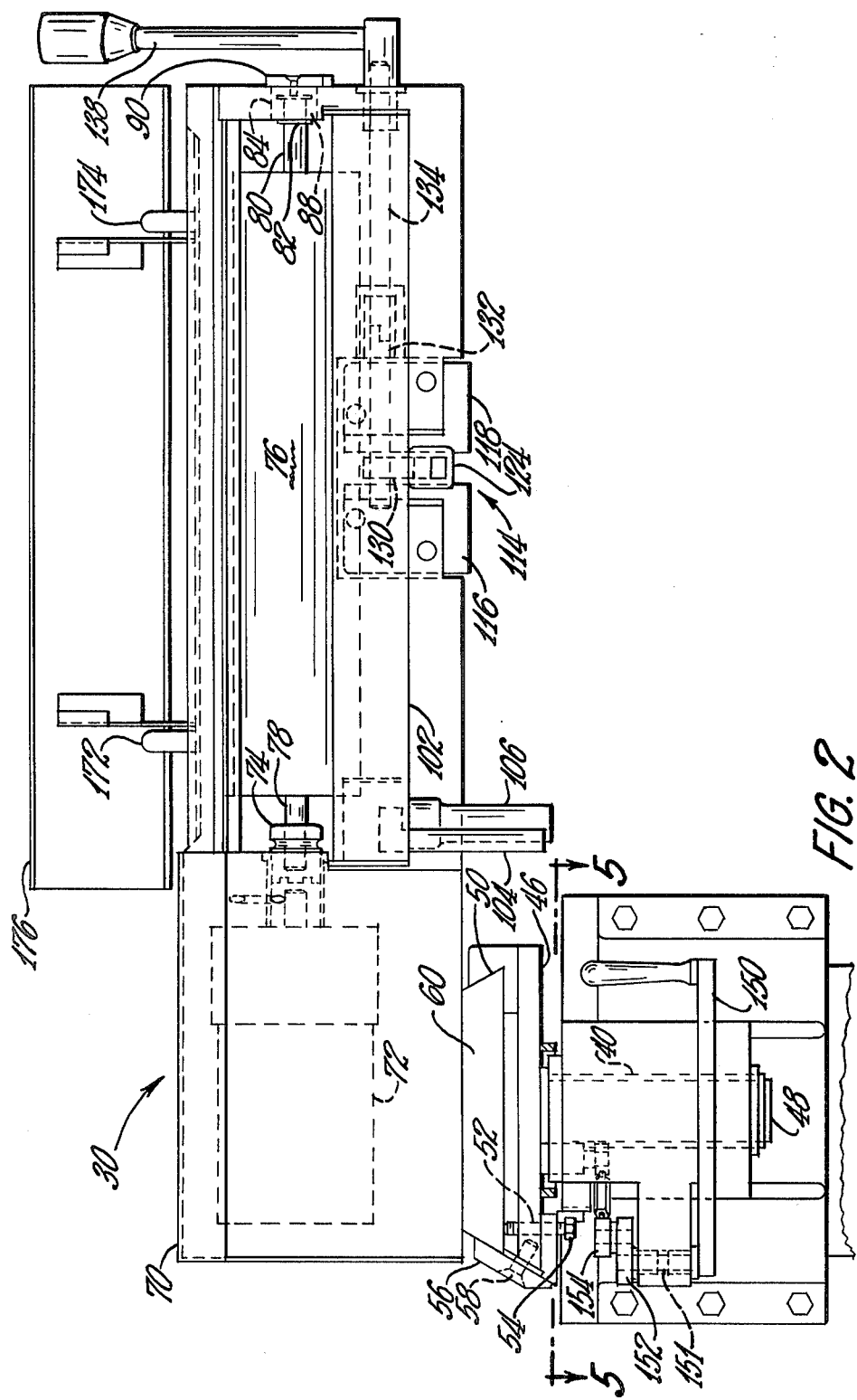
FIG. 2 is an enlarged frontal view of the applicator system depicted in FIG. 1.
Figure 3:
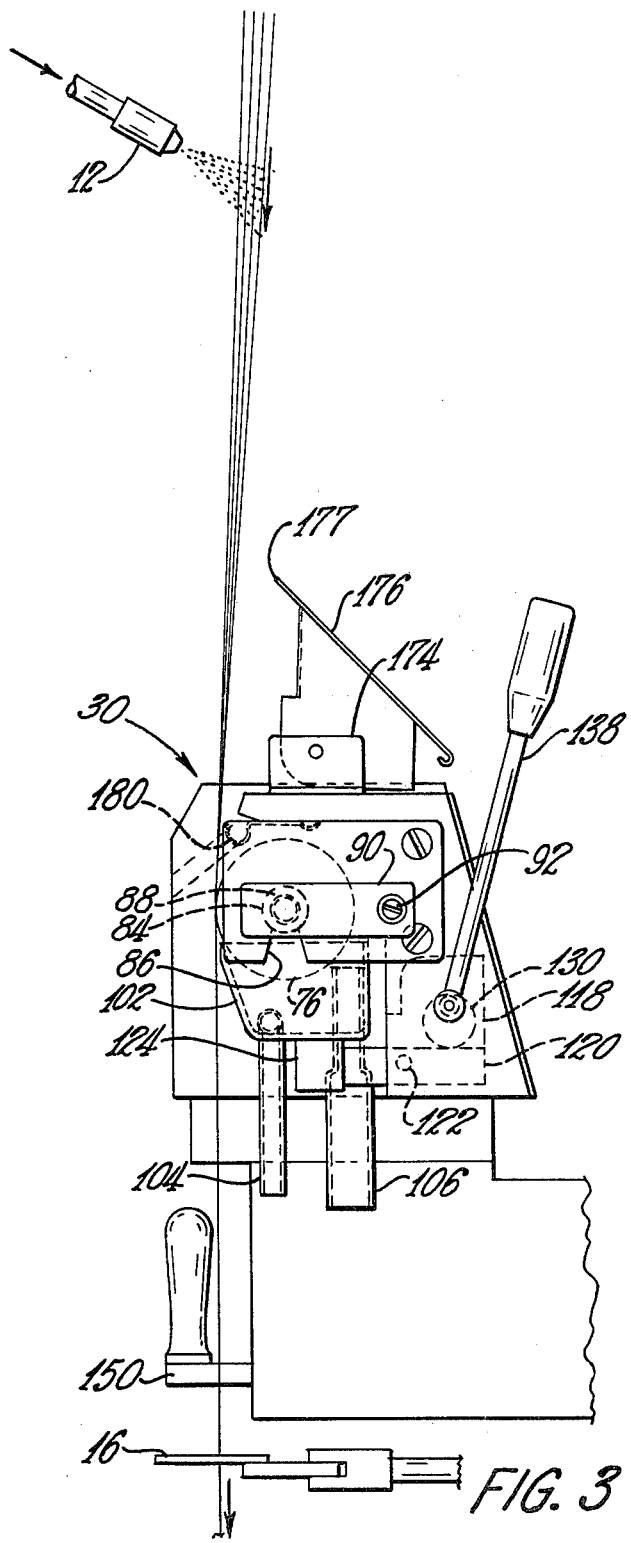
FIG. 3 is a side elevational view of the applicator system shown in FIGS. 1 and 2.

Furthermore, carriage 60 is adapted to be adjustably rotated or moved along a path or plane substantially transverse, preferably perpendicular, to the first plane. As shown in FIG. 2, carriage 60 is adapted to pivot about the side thereof located at the beveled section 50 of base 46. The opposite side of carriage 60 is adapted to be moved along a vertical path by first adjustment means consisting of a threaded hole in base 46 and screw 54 which engages base 46 at the bottom side thereof. When the retainer means 56 is loosened, one side of carriage 60 can be moved by means of the first adjustment means to move or rotate the applicator substantially about a second axis substantially transverse to the first axis, and preferably perpendicular thereto. Thus the frame 70 of the applicator is adapted to be moved or rotated in two mutally transverse planes as well as linearly along a path substantially parallel to the second axis but substantially perpendicular to the first axis.

Frame 70 can be securely joined to carriage 60 by any suitable means such as conventional screws or fasteners (not shown). Frame or housing 70 is attached to motor or drive means 72 which is attached to roll applicator 76 by means of coupling 74 which is attached to stub shaft 78 joined thereto along the axis of rotation thereof. Similarly positioned, at the opposite end of applicator surface or roll 76, stub shaft 80 is journaled in frame 70.

Frame 70 includes a recess 84 adapted to accomodate bearing 88 which is suitably joined to the stub shaft 80. Slot 86 is in communication with recess 84, and slot 86 is of a width greater than the outside diameter stub shaft 80 but less than the outside diameter of bearing 88 to allow stub shaft 80 to pass therethrough when bearing 88 has been axially removed from stub shaft 80. This permits applicator surface 76 to be readily removed and replaced. This is necessary because the roller applicator surface is generally a graphite material which is abraded by the advancing filaments in contact therewith.

Bearing 88 and thus stub shaft 80 are suitably positioned in Frame 70 by means of retainer ring 82 registered in a circumferential groove in stub shaft 80 to prevent axial movement of roll 76. Bearing 88 is also axially held in place by means of latch 90 positioned to cover recess 84 with latch 90 being held in place by means of fastener 92 at frame 70.

Container or tray 102 having inlet and outlet passageways 104 and 106 which are connected with a suitable source of size and/or binder and return line respectively as is known in the art, is adapted to supply the size and/or binder to the surface of applicator roll 76. Applicator roll 76 is rotated through the pool of size and/or binder held in container 102 by means of motor 72 such that the surface of applicator roll 76 is wetted with the sizing material to apply the sizing material to the advancing filaments when the applicator system is in the operational mode.

Tray 102 is releasably located in frame 70 by means of tray positioning means 114. Tray positioning means 114 is comprised of braces 116 and 118 which are suitably fastened to frame 70. Lever 120 is pivoted at braces 116 and 118 at stub shaft 122 fixedly joined to lever 120 at a point intermediate the ends of lever 120. Resilient member or button 124 is positioned at one end of lever 120 to contact the bottom of tray 102.

The opposite end of lever 120 is positioned to engage cam 130 which is securely fastened to inboard shaft 132 which is coupled with outboard shaft 134. Shafts 132 and 134 are journaled in seat 136 of frame 70, and outboard shaft 134 is securely fastened to handle 138.

The tray positioning means 114 is designed such that as handle 138 is rotated about outboard shaft 134, inboard shaft 132 also rotates cam 130 forcing the end of lever 120 in contact therewith to rotate downwardly about stub shaft 122. Thus, the resilient member 124 on the opposite end of lever 120 is forced upwardly against the bottom of container 102, and the top of container 102 is pushed against frame 70 to securely hold tray 102 in position.

When a change of tray 102 or applicator roll 76 is desired, handle 138 is merely rotated in the opposite direction to release tray 102 which then can be readily slid out of frame 70.

Actuator means 148 is adapted to effect the rotation of frame 70 about the vertical axis of bore 40. Actuator means 148 can be a hand operated system as shown in the drawings or actuator 148 can be a suitable hydraulic, pneumatic, or electrical system.

As shown, actuator means 148 is comprised of arm 150 having an upstanding section 151 which is journaled in aperature 42 of bracket 32. Toggle member 152 is securely fastened to one end of upstanding section 151 which is suitably rotatably fastened to second adjustable means or link assembly 153. Link assembly 153 is comprised of threaded rotatable fitting 154 which is suitably journaled at the distal end of toggle member 152. Threaded rotatable fitting 156 is suitably journaled on depending projection 62 of base 46. Threaded sleeve 158 engages threaded fittings 154 and 156 to permit lengthwise adjustment of link assembly 153 as threaded sleeve 158 is rotated. Threaded sleeve 158 is held in position by means of lock nut 160 registered on threaded fitting 154.

As shown in FIG. 5, it can be seen that as arm 150 is rotated about upstanding section 151 journaled in bracket 32, toggle number 152 is rotated to move link 153 to apply force to depending projection 62 of base 46 causing base 46 to rotate about the vertical axis of bore 40. Thus, as arm 150 is pulled away from bracket 32, frame 70 is caused to rotate in a counterclockwise direction such that applicator surface 76, located in frame 70 is moved out of the path of the advancing filaments. To return the applicator to the production position, arm 150 is merely rotated in the opposite direction.

Adjustable stop 164 suitably secured to bracket 32 is adapted to position arm 150 at a predetermined point in the closed position.

To reduce the contamination of the binder and/or size a trough 180 is provided along the upper front edge of frame 70 immediately adjacent the filaments but not in contact therewith when the applicator assembly is in the production position to collect and drain away any water or foreign matter that might collect at that portion of the frame. Trough 180 is positioned along the length of the applicator roll 76 and can be attached to frame 70 by means of fasteners (not shown).

Even though the applicator assembly is adapted to pivot the applicator roll away from the advancing filaments, it is sometimes desirable to merely move the advancing filaments away from the surface of the applicator roll, in the production position, for a brief time, rather than pivoting the entire assembly. The movable cover 176 is adapted to move the filaments away from the applicator surface such that the sizer binder is not transferred to the advancing filaments.

Movable cover 176 is pivoted about bosses 172 and 174 which are suitably attached to frame 170 at the upper surface thereof. Movable cover 176 is adapted to perform several functions. As such, cover 176 is adapted to rotate about a horizontal axis, and when rotated to the closed position, the front edge 177 is adapted to contact the advancing filaments such that the filaments are moved away from the application surface 76 during the attenuation of waste strand such that the waste strand is not coated with the binder and/or size. Furthermore, cover 176, when in the open or primary product position, is adapted to direct a portion of the entrained air moving along with the advancing filaments along downwardly and away from the filaments in a smooth continuous manner to reduce the amount of air wa..hing over the region of the applicator surface in contact with the advancing filaments and to provide a degree of protection for the applicator assembly.

Due to the variations in construction between forming positions, the adjustability provided by the applicator system as set forth herein provides a movable applicator which is capable of being adjusted in a number of directions to provide for optimum positioning for best fiber forming operation.

It is apparent, that within the scope of the present invention, modifications and different arrangements can be made other than is herein disclosed. The present disclosure is merely illustrative with the invention comprehending all variations thereof.

We claim:

1. Apparatus adapted to apply a coating to advancing continuous filaments comprising:
   a bracket;
   a base journaled at said bracket for rotation about a first axis;
   means for rotating said base;
   applicator means adapted to apply a coating to the advancing filaments;
   a carriage joined to said applicator means, the carriage being adapted for a sliding engagement with said base along a path substantially transverse to said first axis; and
   a first adjustment means adapted to rotate said carriage and said applicator means about a second axis substantially transverse to said first axis.

2. The apparatus of claim 1 wherein said applicator means is comprised of a container adapted to supply the coating to an applicator surface to coat said filaments, a frame connected to said surface, and a lever journaled at said frame adapted to releasably position said container adjacent said surface, said lever engaging a cam adapted to releasably press said container against said frame.

3. The apparatus of claim 1 wherein said base has a beveled section adapted to slideably engage one side of said carriage and a retainer means fastened to said base of said carriage and a retainer means fastened to said base at the opposite side of said base adapted to releasably locate said carriage, said first adjustment means being located in said base adjacent said retainer means to rotate said carriage and said applicator means about said second axis.

4. The apparatus of claims 1, 2, or 3 wherein said means for rotating said base is comprised of an arm journaled in said bracket; an extensible connecting link adapted to connect said arm and a projection depending from said base.

5. The apparatus of claim 1 further comprising a movable cover positioned at said applicator means adapted to contact the advancing filaments to move the filaments from the applicator surface of the applicator means such that the filaments are not coated with said coating when said cover is closed.

6. Apparatus for forming glass filaments comprising:
   a feeder adapted to supply a plurality of streams of molten glass;
   means for attenuating said streams into continuous filaments;
   a bracket having a bore having a vertically oriented axis and an aperature spaced from said bore;
   a base journaled in said bore for rotation about the vertical axis, said base having a beveled section, a retainer means spaced from said beveled section, and a projection;
   a carriage adapted to slideably engage said base to releasably move in a plane substantially perpendicular to said vertical axis along said beveled section and said retainer means, said base having a first adjustment means adjacent said retainer means adapted to rotate said carriage about a second axis substantially transverse to said vertical axis;
   a frame secured to said carriage;
   an applicator surface located at said frame adapted to coat the advancing filaments with a size and/or binder;
   an arm pivoted at said aperature, a portion of said arm extending through said bracket, said portion securely fastened to a toggle member; and
   a link rotatably connected to said toggle member and said projection of said base to rotate said base in response to movement of said arm, said link having a second adjustment means adapted to adjust the position of said base about said vertical axis with respect to the position of said arm.

7. The apparatus of claim 6 further comprising a container adapted to supply said binder and/or size to said applicator surface;
   a lever pivoted at said frame;
   a cam positioned to engage one end of said lever to position the opposite end of said lever at said container to releasably position said container against said frame.

8. The apparatus of claim 7 wherein said applicator surface is a cylindrical element having a stubshaft projecting from each axial end of said element journaled in said frame, said frame having a recess adapted to receive a bearing engaging one of said stubshafts, said frame having a slot having a width greater than the diameter the stubshaft associated therewith, said slot being in communication with said recess to permit the cylindrical element to be removed from said frame when said bearing is removed from said stubshaft.

9. The apparatus of claim 6 further comprising a cover pivoted at said frame adapted to contact said filaments to move said filaments from the applicator surface such that said filaments are not coated with binder and/or size when the cover is closed.

* * * * *